United States Patent [19]
Rosen

[11] Patent Number: 6,163,932
[45] Date of Patent: Dec. 26, 2000

[54] PROCESS, USING AMMONIA RICH WATER FOR THE SELECTION AND ENRICHMENT OF NITRIFYING MICRO-ORGANISMS FOR NITRIFICATION OF WASTEWATER

[75] Inventor: Bjorn Hubert Rosen, Farjestaden, Sweden

[73] Assignee: Scanvironment AB, Farjestaden, Sweden

[21] Appl. No.: 09/355,546

[22] PCT Filed: Jan. 28, 1998

[86] PCT No.: PCT/SE98/00120

§ 371 Date: Jul. 29, 1999

§ 102(e) Date: Jul. 29, 1999

[87] PCT Pub. No.: WO98/33745

PCT Pub. Date: Aug. 6, 1998

[30] Foreign Application Priority Data

Jan. 30, 1997 [SE] Sweden .................................. 9700302

[51] Int. Cl.$^7$ ..................................................... C02F 3/30
[52] U.S. Cl. ............................ 20/605; 610/624; 610/630; 610/631; 610/903
[58] Field of Search .................................... 210/605, 903, 210/610, 611, 614, 620–631

[56] References Cited

U.S. PATENT DOCUMENTS 3,394,814 7/1968 Albertson ................................. 210/195
5,356,537 10/1994 Thurmond et al. ...................... 210/607

FOREIGN PATENT DOCUMENTS

| 0 346 013 | 12/1989 | European Pat. Off. . |
| 0 534 351 A2 | 3/1993 | European Pat. Off. . |
| 29 24 449 | 1/1981 | Germany . |
| 9103130 | 10/1991 | Sweden . |
| WO 93/06049 | 4/1993 | WIPO . |

*Primary Examiner*—Thomas G. Wyse
*Attorney, Agent, or Firm*—Merchant & Gould

[57] ABSTRACT

The present invention comprises a method for biological oxidation of nitrogen in water, e.g., wastewater, nitrification, by using ammonia-rich water for the selection and enrichment of nitrifying micro-organisms in a separate aerated reaction volume, where organic matter already has been reduced. The nitrifying micro-organisms will get a competing edge compared to other species, as they are being able to obtain energy from the oxidation of ammonia into nitrate. The method can be applied to the activated sludge process by the introduction of a sludge aeration zone on the recycled sludge, and also be combined with a sludge anoxic zone, for denitrification, enabling a more reliable operation of biological nitrogen as well as phosphorus removal, by maximal use of reaction volumes with lower detention time and lower costs. It can also be applied to a fixed bed process. The possibility of stimulating the micro-organisms to higher activity by changing the physical-chemical conditions is also included, as well as improving the sludge separation characteristics. The method is enabling an overall view of the process, integrating different process stages for optimisation and best possible operational results.

14 Claims, 3 Drawing Sheets

PROCESS, USING AMMONIA RICH WATER FOR THE SELECTION AND ENRICHMENT OF NITRIFYING MICRO-ORGANISMS FOR NITRIFICATION OF WASTEWATER

Wastewater is treated in treatment plants by mechanical (primary), biological (secondary) and sometimes also (tertiary) chemical treatment. When using mechanical treatment, suspended solids are separated by some form of sieving, followed by separation, usually sedimentation. The removal of organic matter as well as nutrients (nitrogen and phosphorus) and bacteria, however, is not very high.

For further removal, biological treatment is needed, which means that micro-organisms transform organic matter into bio-mass, or sludge, provided that correct physical-chemical conditions are at hand. To enable this process, access to oxygen, or aerobic conditions, is required, which is obtained by some form of aeration system. Furthermore, nutrients like nitrogen and phosphorus must be present, which is the case in municipal wastewater in abundance. When using biological treatment, more than 90% organic removal can be achieved, as well as high removal of bacteria. Nutrient removal, however, will be limited to some 30% nitrogen and phosphorus removal by assimilation into the bio-mass, which is removed as excess sludge for separate treatment and recovery, or disposed of.

For further reduction of finely dispersed impurities, remaining after the previous treatment, and particularly for the removal of phosphorus, chemical treatment can be used. Chemical treatment involves the addition of a coagulant, which is able to coagulate and flocculate remaining impurities into chemical flocs, also precipitating phosphorus, resulting in more than 90% removal of phosphorus. When this tertiary chemical treatment is introduced as post-precipitation after the primary and biological treatment, the removal of organic matter, phosphorus and bacteria can be considerably increased. The coagulant can also be fed into the primary settling stage, pre-precipitation, or in the biological stage, simultaneous precipitation, which in many Swedish treatment plants has resulted in the possibility of using the existing tertiary stage for other purposes, or as an extra safety.

The obtained removal of nitrogen is thus by assimilation, or some 30%. If the sludge is stabilised for possible reuse in agriculture, some of the assimilated nitrogen is released, and re-circulated with the reject water after dewatering, which will result in only 15–20% nitrogen removal.

Below, the conventional methods for wastewater treatment will be presented, in FIGS 1–5, with emphasis on biological nitrogen removal.

Water Treatment

In water treatment as well, nitrogen can give problems. The increased use of fertilisers, not rarely overdosed, has resulted in higher contents of nitrates in rivers and lakes, as well as in the groundwater, all being used as a portable water source. Nitrate can be reduced to nitrites, which is toxic to infants.

Treatment Processes

In order to achieve further removal of nitrogen, ion exchange might be used, though quite costly. Instead biological treatment methods have been developed to first biologically degrade nitrogen compounds to nitrate, nitrification, and then remove nitrogen by dissimilative reduction to gaseous nitrogen by biological denitrification. For potable water treatment nitrogen is often present as nitrate, and biological denitrification can be used.

Biological Treatment

All treatment of (waste) water includes the separation of suspended matter, either in the untreated (waste) water, or in the biological or chemical treatment stage. Biological treatment involves the transformation of organic matter by micro-organisms into biological flocs, which are separated from the water. Chemical treatment means the transformation of colloidal or fine suspended solids, as well as dissolved matter like phosphorus, into chemical flocs, which are separated from the water.

Normally, the transformation processes are discussed, being very complex. The separation of flocs, however, is more often giving problems, not least at peak flows.

With the presented invention the transformation process with nitrification and denitrification can be more effective, as well as the separation properties of the flocs, for an overall better performance in smaller volumes, which is of great importance by upgrading of treatment plants.

Definitions

Nitrification=ammonia ($NH_4$)=>nitrite ($NO_2$)=>nitrate ($NO_3$)

Denitrification=nitrite ($NO_2$)=>gaseous nitrogen ($N_2$)

BOD=biological oxygen demand (measurement for organic matter)

COD=chemical oxygen demand (measurement for organic matter)

Aerobic=oxygen rich environment (also called oxic zones)

Anoxic=no dissolved oxygen, though chemically bound oxygen present

Anaerobic=no dissolved chemically bound oxygen

Excess sludge=produced sludge to be removed also called Surplus sludge or Waste activated sludge Sludge age=detention time of the sludge in the process= the sludge amount in the process divided by the excess sludge, measured in days In biological treatment, oxygen is fed into the wastewater by aeration or some other means, and micro-organisms are then transforming impurities into cells or bio-mass, forming biological flocs. The flocs are then separated as a sludge in the separation stage. The process can be carried out as a fix film process with immobilised micro-organisms, e.g., in trickling filters, rotating biological discs or suspended carriers. The mostly used process, however, is the activated sludge process, is using suspended micro-organisms, which are separated and recirculated from the separation stage, thus building up a large concentration of active micro-organisms, in an aerated (oxygenated) reactor, where rapid degrading of organic matter will be achieved.

Below, the well known technology for biological treatment and the invention will be presented and discussed, referring to the following figures.

THE ACTIVATED SLUDGE PROCESS

Figure 1A:
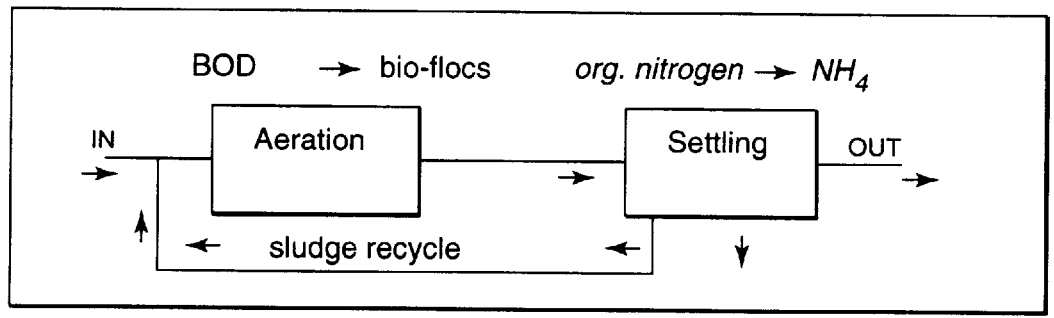
FIG. 1A shows an activated sludge process for the removal of organic matter

In a conventionally designed activated sludge process, organic matter is transformed into biological flocs by the micro-organisms, and organic nitrogen is degraded into ammonia nitrogen FIG. 1A.

The activated sludge process will give a high removal of organic matter, measured as BOD, though having a disadvantage by the large amount of recirculated sludge. At peak flow conditions, e.g. by rain storms or in snow melting periods, there is a risk for the sludge not having time to settle and thus following the discharged water, so called solids carry over. Another problem with the process is that at unfavourable composition of the wastewater, or when the process is not properly followed up, the 'wrong' type of micro-organisms might be formed, e.g. filamentous micro-organisms, resulting in poor floc separation conditions, called 'sludge bulking'.

Figure 1B:
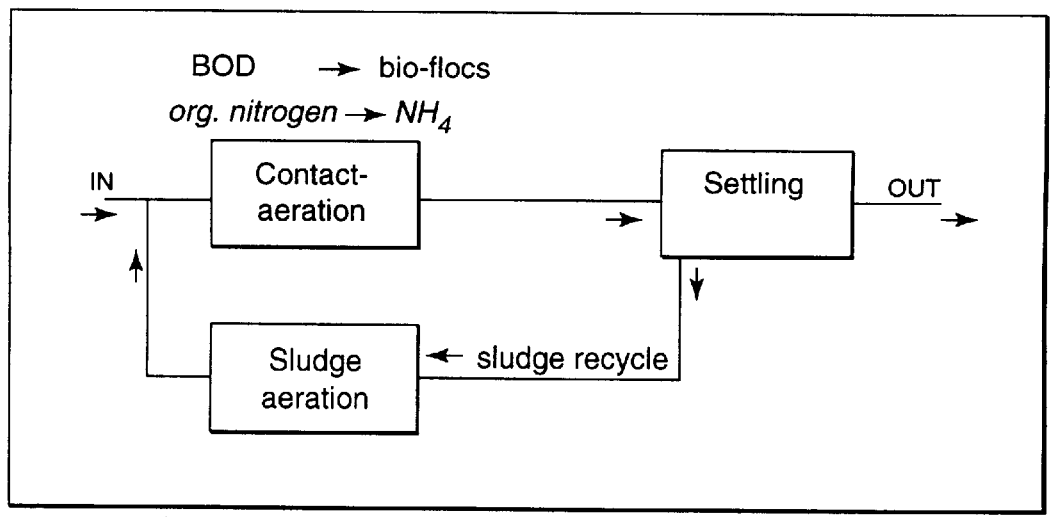
FIG. 1B shows an activated sludge process with sludge aeration, biosorbtion

One way of reducing the impact of peak flows is to introduce a separate sludge aeration volume. The recirculated sludge will be activated, resulting in rapid removal of organic matter, when the sludge is mixed with incoming wastewater in the contact volume. At the same time, a sludge storage is obtained, separated from the incoming water. The modification is often called 'bio-selection', requiring less total volume, FIG. 1B.

Nitrification

In order to achieve biological denitrification, it is imperative that the nitrogen is oxidised into nitrite, nitrification, which occurs in two stages, using different micro-organisms:

ammonia ($NH_4$)=>nitrite ($NO_3$)=>nitrate ($NO_3$)

In order to achieve nitrification, longer detection time and/or higher temperature is required, compared to only removing organic matter (BOD), and in many treatment conventionally designed plants, nitrification will occur at low loads during the summer time, sometimes giving problems when post-precipitation is in use.

During the nitrification process alkalinity is reduced and the pH-value might decrease, making it impossible to optimally operate post-precipitation without adjusting the pH.

Figure 2:
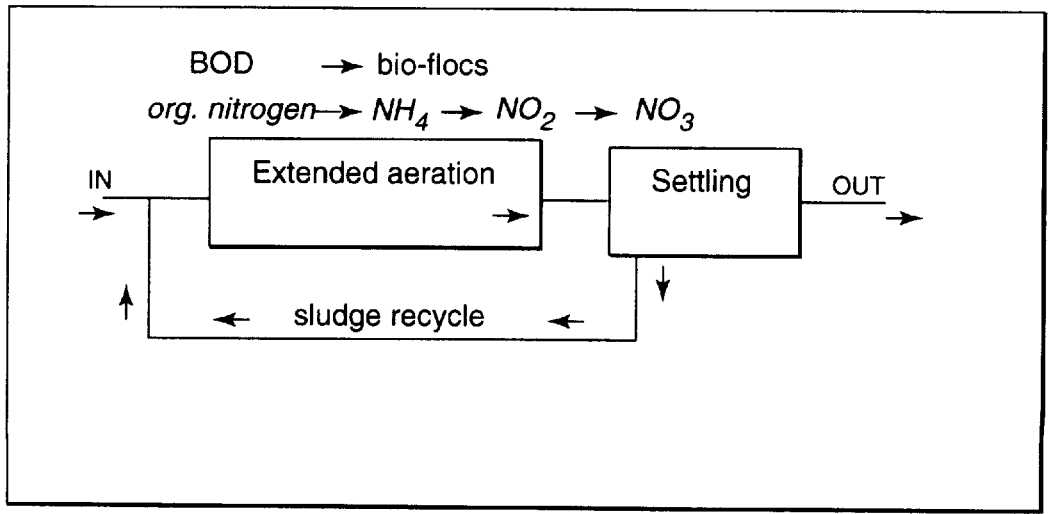
FIG. 2 shows an activated sludge process with nitrification

The nitrification requires a higher sludge age and higher detention time than for just BOD-removal, FIG. 2. The oxygen consumption will also increase, normally more than 50%.

The ammonia nitrogen is transformed via nitrite to nitrate using autotrofic micro-organisms with a longer regeneration time than the micro-organisms, which remove organic matter, BOD. That is the reason for the necessary longer detention time, as otherwise the nitrifying micro-organisms, nitrifiers, will be washed out from the process. The regeneration time for the nitrifiers is some 3 days, and a sludge age of 10 days is normally required. Practical experience, however, shown that at a sludge age of 8 days, stable nitrification/denitrification has resulted in effluent values of some 8 mg total nitrogen per liter at a temperature of 8 degrees.

Denitrification

Figure 3:
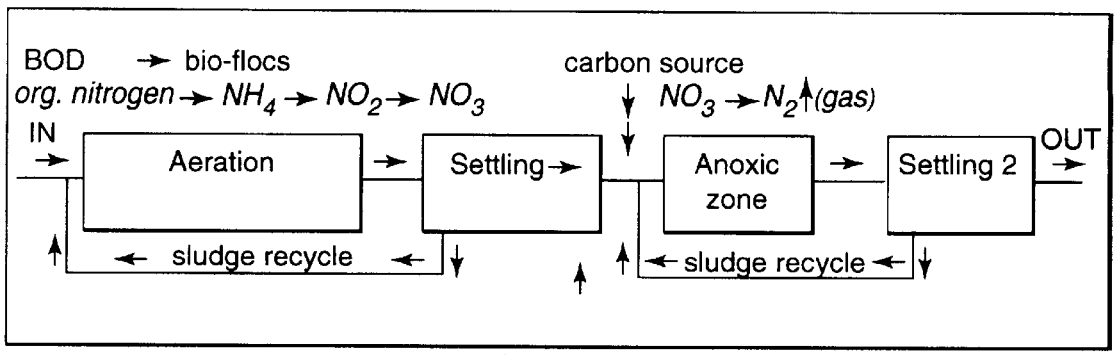
FIG. 3 shows a two-stage activated sludge process with post-denitrification

The denitrification, requires an anoxic environment, i.e. no dissolved oxygen, where the micro-organisms takes the necessary oxygen from the nitrates, being transformed into gaseous nitrogen into the atmosphere, FIG. 3. The alkalinity and pH-value is increased. The denitrification requires access to easy degradable carbon, and at the first treatment plants for biological nitrogen removal, methanol was dosed into a second activated sludge stage for post-denitrification. A two-stage process will increase both investment and operation costs, as expensive organic matter has to be used, where the process previously has removed organic matter.

Pre-Nitrification

Figure 4:
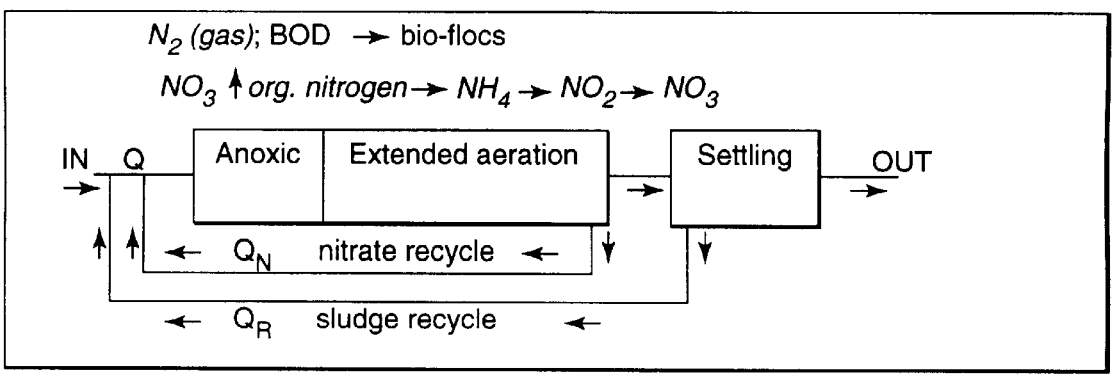
FIG. 4 shows an activated sludge process with pre-denitrification
Figure 5:
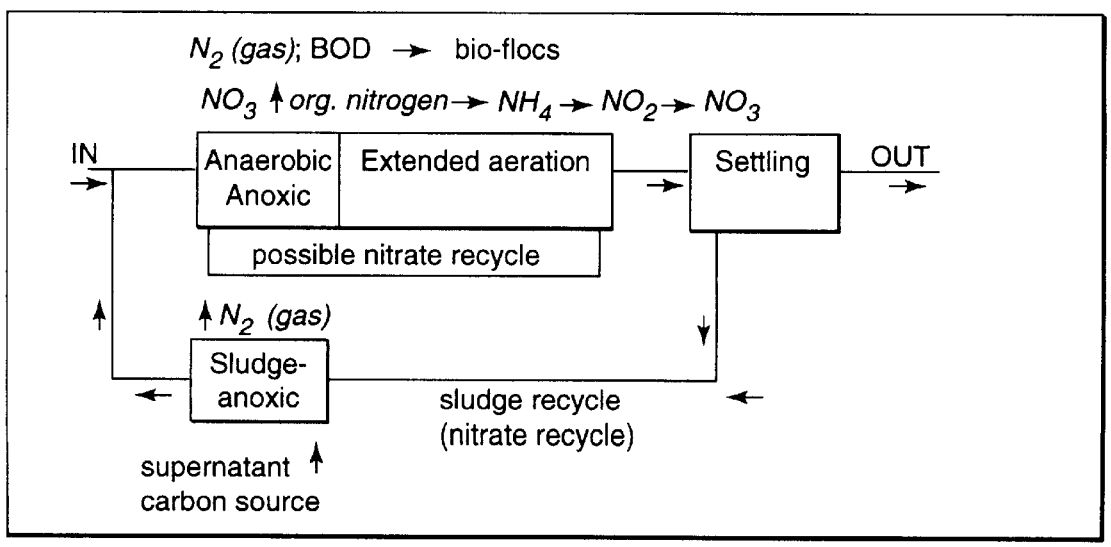
FIG. 5 shows an activated sludge process with pre-denitrification and sludge anoxic zone

In South Africa, a process modification with pre-denitrification was presented in the seventies, where the incoming organic matter in the wastewater was used as a carbon source for recirculated nitrified water from the following nitrification stage, FIG. 4 The load in the nitrification stage will be reduced, as some of the organic matter, BOD, will be used in the pre-denitrification. The operation costs will be lower, as less oxygen is needed and external carbon will be needed.

The pre-nitrification can be introduced as soon as nitrification has been reached and the process has several advantages.

The so called BarDenPho-process after its inventor, James Barnard, was expected to have possibilities in a colder climate like in Sweden, and the technical solutions used there, and was introduced in full scale in the city of Falkenberg 1983.

The possible nitrogen removal is limited by the amount of recycled nitrate to the anoxic zone, or

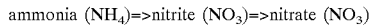

$N_{red}=100 *(Q_a+Q_x)/(Q+Q_a+Q_x)\%$

For example, the possible nitrogen reduction at 100% recycle of sludge and nitrate water will be $100*100/(100+100)=50\%$, 200% recycle $100*200/(100+200)=67\%$, and so on, FIG. 4. Additional to the nitrogen, being removed as gaseous nitrogen, will come the assimilation of nitrogen in the sludge, which, depending on the characteristics of the wastewater and to some extent the process design, normally is some 6–8% of the sludge production.

In South Africa, nitrogen removal is necessary for the re-use of water, when it is important to keep the salt content low. The target is highest possible removal, which led to 500–800% total recycle.

If the requirement is less stringent, 10–15 mg/l, i.e., like in Sweden, it is sufficient with only sludge recycle, possibly with a little higher capacity. In many full-scale tests, the denitrification in the anoxic zone has been limited, which was interpreted as lack of easily degradable carbon. Instead the poor results were dependent on too high recycle, in accordance to the original concept, giving too short detention time and wrong conditions for denitrification.

By only closing down nitrate recycle pumps, dramatic improvement has been achieved, resulting in decreased discharge from 20 to 10 mg nitrogen per liter. As a summary, the following conditions must prevail for efficient nitrogen removal:

Nitrification, which requires
  Sufficient sludge age (normally more than 8 days)
  Sufficient alkalinity
  Correct pH-value (preferably 8,0–8,5)
  Oxygen content (>2 mg/l)
  Not too low temperatures
  Efficient (not inhibited sludge)
Denitrification, which requires
  Access to easily degradable carbon
  No dissolved oxygen
  Low redox potential
  Efficient (not inhibited sludge)

MAX USE OF REACTION VOLUMES

Sludge anoxic zones

It is imperative to have sufficient number of micro-organisms in the system for the required task, and particularly not to lose sludge at peak flows or other disturbances. In order to achieve this, it is a question to design the reaction volume and separation stages correctly, as well as to have an operation strategy for optimal use of the treatment plant. It is evident, that a plant should be operated with highest possible sludge content, and at the same tame ascertain that the sludge will not be lost. This can be achieved by a correct design of the separation stage and an overall operation strategy with safety and seeding possibilities.

By the introduction of a sludge anoxic zone for the recycled sludge, maximal sludge amount per unit volume will obtained, and consequently also highest possible denitrification, provided a carbon source is available. The carbon source can be a supernatant from a primary thickener, or as an external source, preferably ethanol. Another possibility can be to use part of the influent raw sewage after pre-treatment, where the influent raw BOD will be the carbon source. Thus the primary (pre-precipitation) stage and the biological treatment will less loaded, resulting in lower operation costs and higher capacity.

Another advantage with the sludge anoxic zone is the 'anoxic biosorbtion' with a sludge storage, reducing the impact of short peak loads on the process.

In order to get better control and monitoring, the process can be operated with on-line instrumentation, preferably ammonia metering in the sludge aeration zone, and pH/redox-metering in the sludge anoxic zone.

BIOLOGICAL PHOSPHORUS REMOVAL

In order to enable biological phosphorus reduction, no nitrate can be present. As the recycled sludge will have the same nitrate content as the effluent from the process, and consequently cannot be led to an anaerobic zone without removal of nitrate. The best way of achieving this is to introduce a sludge anoxic zone on the recycled sludge. Thus the reaction volumes will be optimally used.

Anaerobic zones

A process design with a sludge anoxic zone will automatically enable biological phosphorus removal, as anaerobic conditions will come forth as soon as nitrate is used up in the recycled sludge. Biological phosphorus removal means that more phosphorus is assimilated in the excess sludge in the anaerobic zone (no dissolved oxygen or nitrate). The anaerobic zone will give a competing edge to a certain type of micro-organisms, acinobacter, which an aerobic environment can obtain energy by taking up phosphorus, and in an anaerobic environment by taking up organic matter and releasing phosphorus. A correctly bleeding out of excess sludge will contain 5–6% phosphorus, compared to normally some 1%.

Control of sludge bulking

Some release of phosphorus will happen, however, during sludge stabilisation, and end up in the reject water after dewatering. An anaerobic stage will give another great advantage, as the risk for sludge bulking will be considerably reduced, as the filamentous bacteria are disfavoured in such a stage, and thus the separation characteristics of the flocs will be ascertained.

Filamentous micro-organisms can otherwise result in a voluminous sludge, difficult to effectively separate form the water.

METHOD ACCORDING TO THE INVENTION

Figure 6:
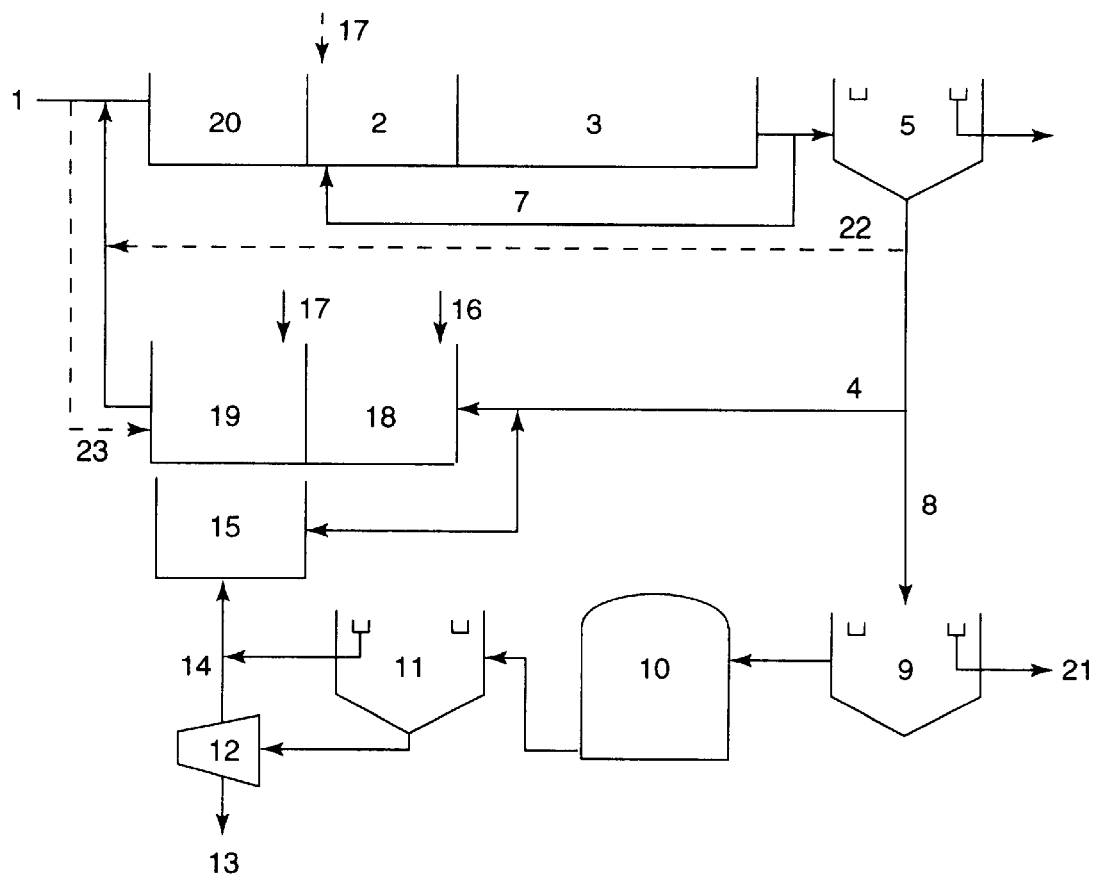
FIG. 6 shows a method for improved biological oxidation and reduction of nitrogen in wastewater to nitrate.

The present invention is illustrated by FIG. 6, and comprises a method for improved biological oxidation and reduction of nitrogen in water, e.g., wastewater into nitrate, nitrification, by influencing chemical, biological and physical conditions in a reactor (18), where organic matter already has been considerably reduced, (2, 3, 20), by the addition of ammonia-rich water (14) with low concentration of organic matter. The reactor (18) is carried out as a sludge aeration reactor, where recirculated sludge (4) with comparatively high concentration of solids is oxygenated. As organic matter is scarce in the reactor (18), the nitrifying micro-organisms will get a competing edge compared to other species using organic matter as energy source, as they are the only ones being able to obtain energy from the oxidation of ammonia into nitrate. Consequently, the result will be a selection and enrichment of nitrifying micro-organisms in the sludge. The sludge aeration reactor is followed by the reduction of nitrate by biological denitrification in a sludge anoxic zone (19), also with high solids concentration, where a carbon source (17) is added.

The method will generate a sludge with large content of nitrifying micro-organisms, resulting in a faster nitrification process, in reactors having a high sludge concentration. The nitrification rat in the 'normal' aeration part of the process (3) will also be faster. The outcome is maximum use of reaction volumes, giving shorter detention time and lower costs, and at the same time a more reliable operation for nitrogen removal.

By controlling the physical-chemical conditions, the nitrifying micro-organisms can be manipulated to higher biological activity by the addition of lime or calcium carbonate (16), which also will improve the sludge separation (5) properties. An additional improvement of sludge properties, an anaerobic zone (20), can 'automatically' be introduced, also enabling biological phosphorus removal, without any special arrangements.

With the presented invention, more active sludge can be kept in the nitrogen removal process, with corresponding higher capacity or less volume needed.

After the reduction of organic matter in a preceding biological process (2, 3, 20), ammonia rich water with little organic matter, e.g. reject water (14) from dewatering of digested sludge (12), is fed into an aerobic reactor (18). The reactor is carried out as sludge aeration reactor, for the nitrification of reject water and remaining ammonia nitrogen in the recirculated sludge. In FIG. 6 the method is shown 1. Influent of water after possible pre-treatment
2. Reaction volume for possible denitrification in anoxic zone(s)
3. Reaction volume for removal of organic matter and nitrification
4. Recirculated sludge from the separation stage
5. Separation of biological sludge
6. Discharge of biologically treated water
7. Possible recycle of nitrified water for further denitrification in (2) above
8. Collection of surplus or waste activated sludge from the process, a very minor part of the recirculated sludge amount
9. Thickening of surplus sludge
10. Reactor for stabilising sludge, e.g. anaerobic digester
11. Thickener/storage for stabilised sludge
12. Dewatering of stabilised sludge
13. Dewatered sludge for disposal
14. Ammonia rich water, e.g. reject water from dewatering
15. Possible balancing of ammonia rich water 16. Possible addition of lime for increase of pH-value and alkalinity.

17. Possible addition of carbon source fore more efficient and rapid denitrification 18. Reaction volume for denitrification in accordance with the invention, carried out as a sludge aeration reactor 19. Sludge anoxic zone 20. Possible anaerobic zone 21. Possible carbon source from thickener, operated for soluble carbon formation 22. Possible bypass at peak load conditions or toxic discharge into the wastewater 23. Possible carbon source, e.g. untreated wastewater The method can especially be used when reject water from dewatering of stabilised sludge (14) is collected, where by anaerobic digestion (10) 15–20% of the total nitrogen load otherwise is re-circulated into the inlet, to be treated in the biological system (2, 3, 20). The method has many advantages, listed below.

The sludge aeration reaction (18) combined with the sludge anoxic zone (19), will contain more sludge with more active nitrifying micro-organisms, which will increase sludge age and denitrification rate.

The 'normal' aeration stage (3), will be less loaded and less oxygen/aeration is required, and the nitrification rate will be higher because of the enrichment of nitrifying micro-organisms in the recirculated sludge. Furthermore, the large amount of sludge in operation in the sludge aeration reactor, (18), has capacity for the nitrification of both the added ammonia rich water, (14), and possible ammonia in the re-circulated sludge, (4), if full nitrification is not achieved in the 'normal' aeration, (3).

Another advantage is that the operation of the process is less sensitive for peak loads, otherwise resulting in sludge carry-over in the effluent, (6), from the separation stage (5). In the worst case complete loss of sludge and consequently nitrification might otherwise occur. The sludge aeration reactor will then be used a storage for seeding at returning to normal operation conditions, enabled by the bypass (22) of all or part of the re-circulating sludge, initiated and controlled by flow or by the solids concentration. This operational mode makes it possible to start up the nitrification process rapidly, even during winter conditions, when otherwise several months' start-up might be necessary.

The by-pass, (22), might also be used if e.g. toxic or inhibiting matter might occur, possibly controlled on-line by toxic metering or a combination of other measuring parameters at the plant inlet. The by-pass can easily be automated.

If the ammonia rich water is collected in a balancing tank, (15), 'dosing' it into the sludge aeration reactor (18) can be done in such a way, that maximal nitrate content is reached at the mixing of aerated sludge with the inlet wastewater (1) in the anaerobic zone, (20), at maximum organic load. The 'dosing' can be controlled by an ammonia metering at the outlet of the sludge aeration.

Furthermore, the biological flocs can be made heavier by the addition of lime or calcium carbonate, (16), which also will increase alkalinity and pH-value if the alkalinity is too low. The effect has been recorded as a 25–30% increase of the nitrification rate. The dosage can either be applied in the sludge aeration reactor, (18), or if pre-precipitation is used, before the primary clarification, 25–100 mg/l. When using Ferro-salts in the pre-precipitation process, the suspended solids, organic matter and phosphorus removal will also be improved in that stage.

Not only the nitrifying micro-organisms might benefit from the sludge aeration reactor, (18), as other aerobic micro-organisms will be activated, for rapid removal in the following process stages, in the sludge anoxic zone (19), as well as in the anoxic zone, (2), and the aeration (3).

When using an external carbon source, (17), dosing control by pH/redox metering in the sludge anoxic zone (19) might be used. If some part of the not pre-precipitated wastewater, (23), would be used if sufficient carbon is not available, control from a suspended solids metering at the inlet can be used, as the correlation between suspended solids and organic matter, measured as BOD or COD is good enough. Another, more accurate, though more expensive, possibility is using on-line measuring of TOC (total organic carbon) for controlling the feeding of organic matter.

If possible, the carbon source used (17), should be internal, e.g. supernatant from the thickeners, (21), possibly improved by simultaneous acid fermentation and thickening. As a 'backup', it is possible to use an external source, preferably ethanol, as no adaption is necessary for on/off operation.

What is claimed is:

1. Method for biological oxidation of nitrogen in water, nitrification, and biological reduction of nitrogen, denitrification, where water after pretreatment is biologically treated, where solids, colloidal and dissolved matter in the water are transformed by micro-organisms into suspended matter, which is separated from the water as a biological sludge, which sludge after treatment is dewatered, where reject water, containing high content of ammonia and low content of organic matter is obtained, wherein when organic matter already reduced is in the wastewater, selection and enrichment of nitrifying micro-organisms will be achieved by the method comprising the steps of:

feeding ammonia rich reject water or other ammonia rich water with a low content of organic matter, into an aerobic reactor in a recirculated stream in the process, resulting in a higher nitrification rate in the aerobic reactor as well as in the aeration zone, thereby oxidizing the ammonia and reducing the residual organic matter in the water;

oxygenating the recirculated sludge in an activated sludge process for the oxidation of ammonia and for the activation of micro-organisms in the sludge in the aeration reactor;

treating the sludge in a following sludge anoxic zone, for biological reduction of nitrate into nitrogen gas under anoxic conditions; and feeding a carbon source into the sludge anoxic zone.

2. The method of claim 1 wherein the step of feeding a carbon source into the sludge anoxic zone comprises feeding a carbon source selected from the group consisting of an easy biologically accessible carbon source fed into the sludge anoxic zone from an external source, a carbon source fed into the sludge anoxic zone from an internal stream, and a carbon source fed as part of the pre-treated wastewater into the sludge anoxic zone.

3. The method of claim 1 wherein the step of feeding the carbon source is controlled by a pH/redoxmeter at the outlet of the sludge anoxic zone.

4. The method of claim 1, further comprising including an anaerobic stage for control of sludge quality and also for possible biological phosphorus removal after the sludge anoxic stage.

5. The method of claim 1, wherein
the ammonia rich water fed to the reactor is controlled by an ammonia meter at the outlet of the reactor.

6. The method of claim 1 wherein at peak flow conditions, the sludge aeration volume is bypassed, and stored sludge later on can be used for seeding; the method further comprising
when necessary, automatically bypassing will be carried out automatically by a method selected from the group consisting of impulse from the inlet flow meter, suspended solids meter in the aeration, recirculated sludge and by industrial discharge, by a toxic meter system, working on-line.

7. The method of claim 1 wherein less than 100 mg/l of line or calcium carbonate is dosed, calculated on the inlet flow into the reaction volume.

8. The method of claim 7, wherein
the lime or calcium carbonate dosage is controlled by a method selected from the group consisting of alkalinity, pH metering and mixtures thereof.

9. The method of claim 1 wherein no separate nitrate recirculation is used.

10. The method of claim 2 wherein the easy biologically accessible carbon source comprises ethanol.

11. The method of claim 2 wherein the carbon source from an internal stream comprises supernatant from thickening operated for a certain acid fermentation of the sludge, and thus more easily biologically accessible carbon will be transferred into the supernatant.

12. The method of claim 2 wherein the step of feeding the carbon source comprising part of the wastewater is controlled by a method selected from the group consisting of suspended solids, TOC and respiration metering in the inlet wastewater.

13. The method of claim 1 wherein the lime or calcium carbonate is dosed into the pre-precipitation, thus improving the removal and consequently decreasing the load on the biological stage, as well as decreasing the coagulant dose.

14. The method of claim 13, the lime or calcium carbonate dosage is controlled by a method selected from the group consisting of alkalinity, pH metering and mixtures thereof.

* * * * *